(12) United States Patent
Aoki et al.

(10) Patent No.: US 8,208,352 B2
(45) Date of Patent: Jun. 26, 2012

(54) OPTICAL DISC APPARATUS

(75) Inventors: Takeshi Aoki, Ota (JP); Takashi Miyamoto, Tokyo (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 65 days.

(21) Appl. No.: 12/625,477

(22) Filed: Nov. 24, 2009

(65) Prior Publication Data

US 2010/0182888 A1    Jul. 22, 2010

(30) Foreign Application Priority Data

Nov. 25, 2008  (JP) .................................. 2008-299166
Jan. 14, 2009   (JP) .................................. 2009-005272

(51) Int. Cl.
*G11B 7/00* (2006.01)

(52) U.S. Cl. ............... 369/44.14; 369/44.17; 369/215.1; 369/219.1; 369/220; 369/249.1; 720/672; 720/675; 720/676; 720/678; 720/679; 720/680

(58) Field of Classification Search .................. 369/192, 369/196, 218, 219, 224, 226, 258, 244, 263, 369/44.14, 44.17, 219.1, 220, 215.1, 249.1; 720/672, 675, 676, 678, 679, 680
See application file for complete search history.

(56) References Cited

U.S. PATENT DOCUMENTS

| | | | | |
|---|---|---|---|---|
| 5,191,575 A | * | 3/1993 | Kido ............................. | 369/223 |
| 5,305,299 A | * | 4/1994 | Maeda ......................... | 720/680 |
| 5,610,899 A | * | 3/1997 | Nomura ....................... | 720/680 |
| 5,615,204 A | * | 3/1997 | Watanabe et al. ............. | 720/679 |
| 5,933,406 A | * | 8/1999 | Ikegame ....................... | 720/679 |
| 6,052,358 A | * | 4/2000 | Morikawa et al. ............ | 720/663 |
| 6,483,798 B1 | * | 11/2002 | Wu ............................... | 720/676 |
| 7,359,292 B2 | * | 4/2008 | Omori et al. ................ | 369/44.14 |
| 2004/0008609 A1 | * | 1/2004 | Fujibayashi et al. .......... | 369/249 |
| 2004/0117811 A1 | * | 6/2004 | Furuya et al. ................. | 720/675 |
| 2006/0200839 A1 | * | 9/2006 | Tabor et al. .................. | 720/676 |

FOREIGN PATENT DOCUMENTS

JP   11-066767   3/1999

* cited by examiner

*Primary Examiner* — Wayne Young
*Assistant Examiner* — Linh Nguyen
(74) *Attorney, Agent, or Firm* — SoCal IP Law Group LLP; Steven C. Sereboff; John E. Gunther (57) ABSTRACT

An optical disc apparatus comprising: a spindle motor configured to drive a turntable on which an optical disc is loaded to rotate; a first substrate on which a first support member rotatably supporting a rotation shaft of the spindle motor is fixed, and on which a second support member is formed at a position adjacent to the spindle motor; a second substrate; an optical pickup device; and a guide member configured to guide the optical pickup device in a radial direction of the optical disc loaded on the turntable, one end of the guide member being supported by the second support member on the first substrate and fixed to a fixing member on the second substrate, and the other end of the guide member being fixed to the fixing member on the second substrate.

7 Claims, 7 Drawing Sheets

OPTICAL DISC APPARATUS

CROSS-REFERENCE TO RELATED APPLICATION

This application claims the benefit of priority to Japanese Patent Application Nos. 2008-299166 and 2009-5272, filed Nov. 25, 2008 and Jan. 14, 2009, respectively, of which full contents are incorporated herein by reference.

BACKGROUND OF THE INVENTION

1. Field of the Invention

The present invention relates to an optical disc apparatus.

2. Description of the Related Art

An optical disc apparatus that can perform a signal reading operation and a signal recording operation by irradiating laser light radiated from an optical pickup device to a signal recording layer of an optical disc is known.

As the optical disc apparatus, those using an optical disc called CD or DVD are widely spread in general, and those using an optical disc with improved recording density called Blu-ray standard have been developed in these days.

The optical pickup device incorporated in the optical disc apparatus is configured to be moved by a rotational driving force of a motor for pickup feeding in a radial direction of the optical disc. Since the optical pickup device needs to accurately read a signal recorded in the optical disc, a moving operation in a radial direction of the optical disc should be performed with accuracy, and the device is configured so that the moving operation is guided by a pair of guide shafts fixed to a fixing substrate in general (See Japanese patent Laid-Open No. 11-66767).

As the optical disc apparatus incorporating the optical pickup device, various types of optical discs such as the above-mentioned CD or DVD standards, Blu-ray standard and the like are used. As this type of the optical disc apparatus, there are various types such as stand-alone type, installed type incorporated in a computer apparatus and the like.

A computer called a personal computer or particularly a notebook computer has been reduced in thickness, and the optical disc apparatus incorporated in such a computer has been also reduced in thickness. If the thickness of the optical disc apparatus is reduced, the thickness reduction of the optical pickup device incorporated therein is also required.

Recently, the optical disc apparatus in the Blu-ray standard that can perform a high-density recording operation is known, and the optical pickup device incorporated in such an optical disc apparatus is required to have accuracy in itself and moreover, moving accuracy of a driving mechanism performing a displacement operation in a radial direction is also required.

The above-mentioned optical pickup device described in Japanese Patent Laid-Open No. 11-66767 is configured to have the moving operation in the radial direction of the optical disc guided by a main shaft and a sub shaft.

However, the shafts described in the above-mentioned gazette is fixed to a mechanical chassis, that is, they are fixed to a chassis different from a base of a spindle motor for driving a turntable on which the optical disc is mounted to rotate, adjustment is needed for making a positional relationship between the spindle motor for driving the turntable to rotate and the shafts in the best state in order to perform the moving operation with high accuracy, and there is a problem that the number of processes in an assembling work is increased.

SUMMARY OF THE INVENTION

An optical disc apparatus according to an aspect of the present invention, comprises: a spindle motor configured to drive a turntable on which an optical disc is loaded to rotate; a first substrate on which a first support member rotatably supporting a rotation shaft of the spindle motor is fixed, and on which a second support member is formed at a position adjacent to the spindle motor; a second substrate; an optical pickup device; and a guide member configured to guide the optical pickup device in a radial direction of the optical disc loaded on the turntable, one end of the guide member being supported by the second support member on the first substrate and fixed to a fixing member on the second substrate, and the other end of the guide member being fixed to the fixing member on the second substrate.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

An optical disc apparatus according to a first embodiment is configured so as to move an optical pickup device in a radial direction of an optical disc loaded on a turntable by a main guide shaft inserted into a guide hole provided in the optical pickup device and having a circular section and a sub guide shaft inserted in a U-shaped groove provided in the optical pickup device, and with respect to a motor substrate on which a bearing rotatably supporting a rotation shaft of a spindle motor for driving the turntable to rotate is fixed and on which the spindle motor is loaded, a support member supporting one end of the main guide shaft is integrally formed.

Also, on the support member of the optical disc apparatus according to the first embodiment, a side-face position regulating portion abutting a side face of the main guide shaft and a lower-face position regulating portion abutting a lower face of the main guide shaft are formed.

Also, on the support member of the optical disc apparatus according to the first embodiment, two side-face position regulating portions abutting both side faces of the main guide shaft are formed.

Also, on the support member of the optical disc apparatus according to the first embodiment, a lower-face position regulating portion abutting a lower face of the main guide shaft is formed.

Also, on the support member of the optical disc apparatus according to the first embodiment, a circular hole into which the main guide shaft is inserted is formed.

Also, the support member of the optical disc apparatus according to the first embodiment is formed by press forming of a motor substrate.

According to the optical disc apparatus of the first embodiment, since the moving operation of the optical pickup device is guided by the motor substrate on which a bearing supporting the rotation shaft of the spindle motor, which is a rotation shaft of the turntable, is fixed, and a position of the main guide shaft regulating the position of the optical pickup device is regulated, a positional relationship between the turntable and the optical pickup device can be accurately set.

Also, according to the optical disc apparatus of the first embodiment, since the relationship between the position of the turntable and the position of the optical pickup device can be brought into the best state with a simple configuration in which the support member regulating the position of the main guide shaft is provided on the motor substrate, an adjustment work in an assembling work is no longer needed, and a great effect is exerted in reduction of a manufacturing cost.

Also, according to the optical disc apparatus of the first embodiment, since the support member is formed on the motor substrate by press forming the motor substrate, the positional relationship between the turntable and the main guide shaft can be accurately set by improving accuracy of the press forming.

Also, according to the optical disc apparatus of the first embodiment, since the support member supporting one end of the main guide shaft is provided on the motor substrate, it has a merit that thickness reduction is easier than a case in which the support member is formed on a substrate on which the motor substrate is fixed or the like.

Figure 2:
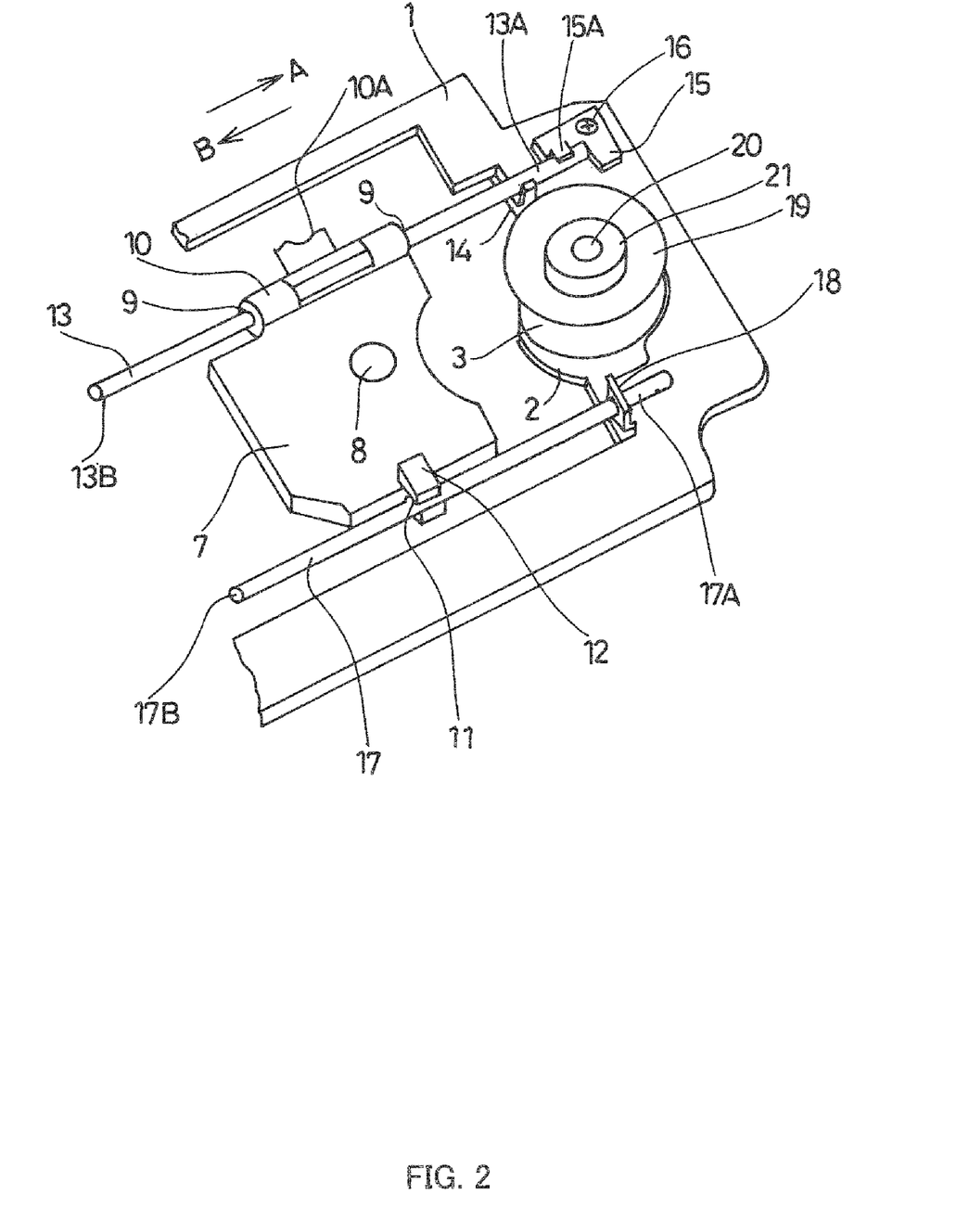
FIG. 2 is a perspective view of an essential part illustrating the optical disc apparatus according to the first embodiment of the present invention.
Figure 3:
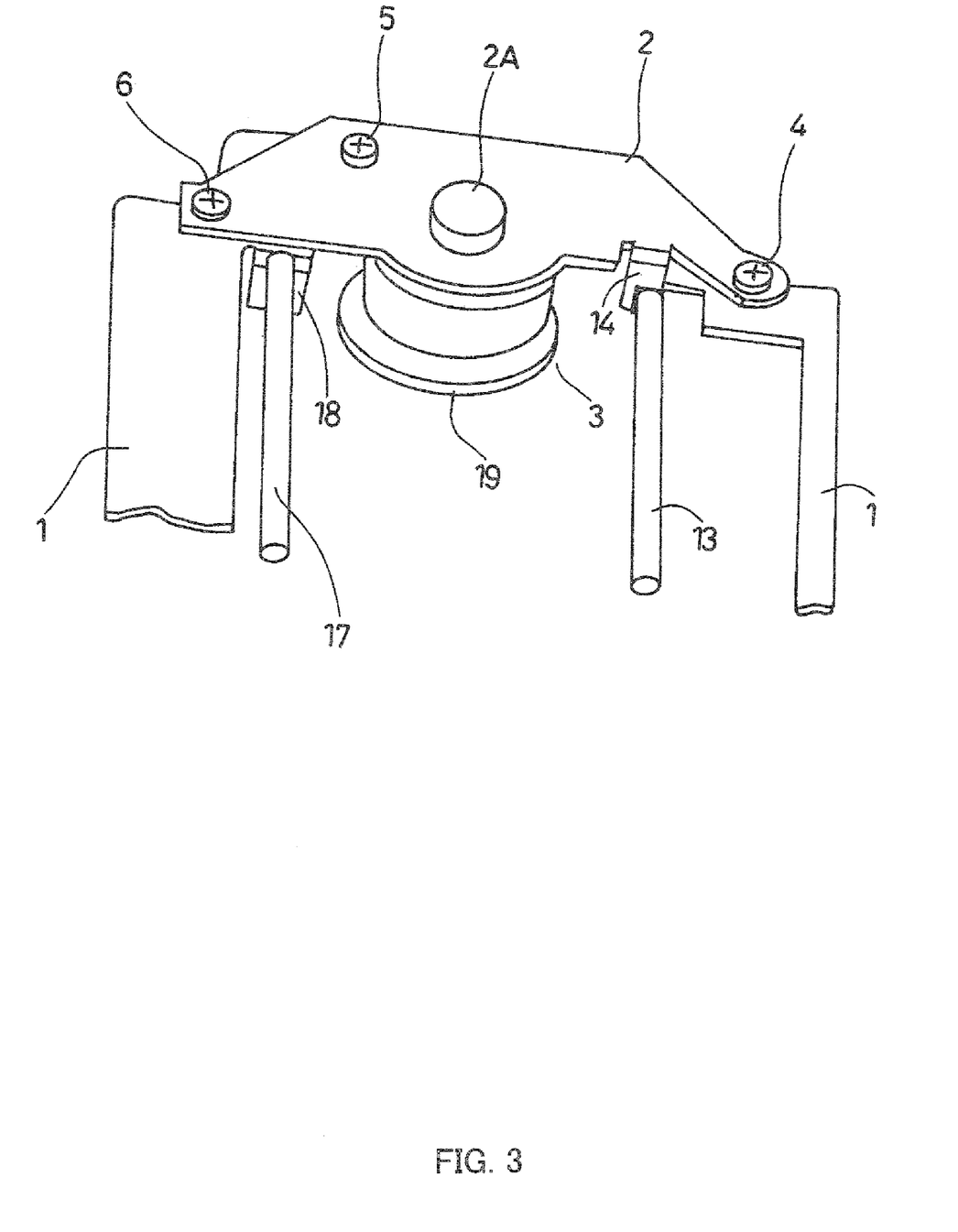
FIG. 3 is a perspective view of an essential part of the optical disc apparatus according to the first embodiment of the present invention when seen from below.

In FIG. 2 and FIG. 3, reference numeral 1 denotes a fixing substrate (second substrate) constituting an optical disc apparatus, reference numeral 2 denotes a motor substrate (first substrate) on which a spindle motor 3 is loaded and fixed, and the motor substrate 2 is configured to be fixed to the fixing substrate 1 by screws 4, 5, 6.

Reference numeral 7 denotes an optical pickup device incorporating an objective lens 8 focusing laser light onto a signal face of an optical disc and an optical component guiding the laser light emitted from a laser diode to the objective lens 8, on one side end of which, a main support arm 10 in which a circular guide hole 9 is formed is provided, while on the other side end, a sub support arm 12 in which a U-shaped groove 11 is formed is provided.

Reference numeral 13 denotes a main guide shaft (rod member) inserted through the guide hole 9 formed in the main support arm 10 of the optical pickup device and having a circular section, and a position of one end 13A is regulated by a support member 14 (second support member) integrally formed at a position adjacent to the spindle motor 3 on the motor substrate 2, while the other end 13B is fixed by a fixing member (not shown) formed on the fixing substrate 1. Reference numeral 15 is a main guide shaft fixing member fixed to the fixing substrate 1 by a screw 16, and a plate spring 15A pressing and biasing the one end 13A of the main guide shaft 13 for fixation is formed.

Reference numeral 17 denotes a sub guide shaft (rod member) inserted through the U-shaped groove 11 formed in the sub support arm 12 of the optical pickup device, and one end 17A is fixed by a sub guide shaft fixing member 18 formed on the fixing substrate 1, while the other end 17B is fixed by a fixing member (not shown) formed on the fixing substrate 1.

Reference numeral 19 denotes a turntable fitted with a rotation shaft 20 constituting the spindle motor 3 and the turntable 19 is constituted so that it is rotated with the rotation shaft 20 and the optical disc is loaded thereon. Reference numeral 21 denotes a centering member fitted and fixed to an upper end of the rotation shaft 20 for performing positioning of the optical disc by fitting with a center hole formed at the center part of the optical disc.

In the above configuration, the optical pickup device 7 is configured to perform the moving operation in the radial direction of the optical disc loaded on the turntable 19, that is, arrow A and B directions by the main guide shaft 13 and the sub guide shaft 17. Also, the radial moving operation of the optical pickup device 7 is configured to be performed by driving a driving arm portion 10A provided by extending the main support arm 10 through a rotational driving operation of a motor for driving optical pickup.

As a driving method of the driving arm portion 10A, a method in which a rack gear is formed on the driving arm portion 10A and a gear meshed with the rack gear is driven to rotate by the motor for driving optical pickup, a method in which a feeding shaft in which a groove for feeding is formed on a peripheral edge is driven to rotate, an engagement portion to be engaged with the feeding groove is formed in the driving arm portion 10A, and a torque of the feeding shaft is transmitted to the driving arm portion 10A and the like can be employed.

The optical disc apparatus according to the first embodiment is configured as mentioned above, and the gist of the first embodiment will be described below referring to FIG. 1.

Figure 1:
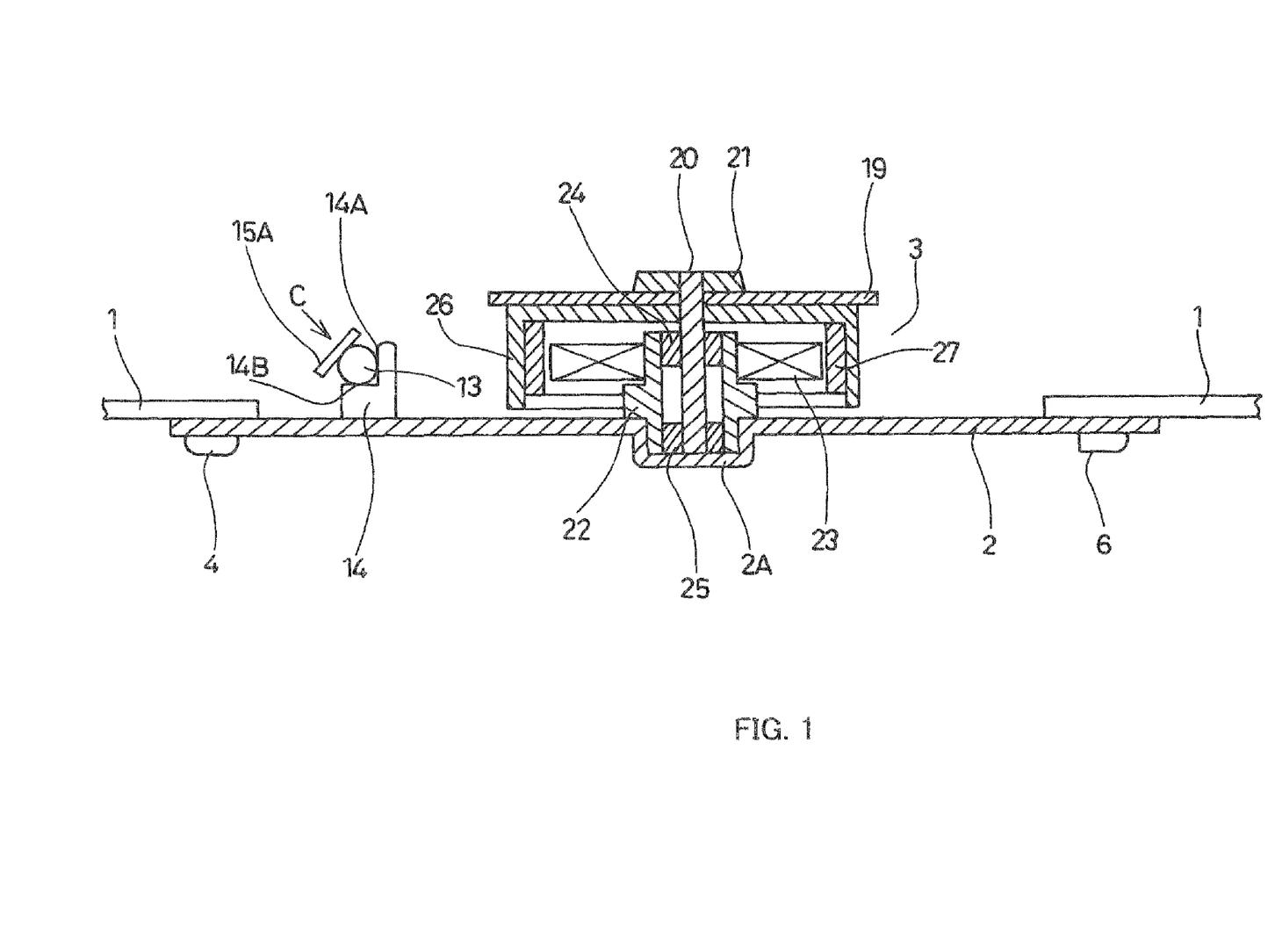
FIG. 1 is a sectional view of an essential part illustrating an optical disc apparatus according to a first embodiment of the present invention.

In FIG. 1, reference numeral 22 denotes a rotation-shaft support member fixed to a rotation support concave portion 2A formed on the motor substrate 2, and a driving coil 23 to which a driving current is supplied when the rotation shaft 20 is to be rotated is fixed thereto. Reference numerals 24 and 25 denote bearings fastened to the rotation-shaft support member 22 and rotatably support the rotation shaft 20 of the spindle motor 3.

Reference numeral 26 denotes a rotor fitted and fixed to the rotation shaft 20 so as to rotate with the rotation shaft 20 integrally, to which a ring-shaped magnet 27 is bonded and fixed to a side wall of an inner face. The spindle motor 3 is constituted by the motor substrate 2, the rotation shaft 20, the rotation-shaft support member 22, the driving coil 23, the bearings 24 and 25, the rotor 26, and the magnet 27.

In the spindle motor 3 with the above configuration, if a driving signal is supplied from a motor driving circuit incorporated in the motor substrate 2 or the like to the driving coil 23, a torque to the rotor 26 is generated by a magnetic force induced from the driving coil 23 and a magnetic force generated from the magnet 27, and the rotor 26 is rotated around the rotation shaft 20.

If the rotation shaft 20 is rotated by a rotating and driving force generated in the rotor 26, the turntable 19 fitted and fixed to the rotation shaft 20 is rotated, and the optical disc loaded on the turntable 19 can be rotated. By controlling intensity of the driving signal to be supplied to the driving coil 23, an interval of a driving pulse and the like, a rotation speed of the optical disc can be controlled to a desired rotation speed.

According to the above configuration, a position of the turntable 19 is determined by the bearings 24 and 25 fastened to the rotation-shaft support member 22 fixed to the rotation support concave portion 2A formed on the motor substrate 2. On the other hand, the main guide shaft 13 positioning the optical pickup device 7 is configured to regulate its position by the support member 14 integrally formed on the motor substrate 2.

The support member 14 is, as shown in FIG. 1, constituted by a side-face position regulating portion 14A (second regulating face) to abut aside face of the main guide shaft 13 and a lower-face position regulating portion 14B (first regulating face) to abut a lower face of the main guide shaft 13. The side-face position regulating portion 14A regulates movement of the main guide shaft 13 in a direction of the spindle motor 3. The lower-face position regulating portion 14B regulates the movement of the main guide shaft 13 in a direction of the motor substrate 2. The one end 13A of the main guide shaft 13 is pressed and biased by the plate spring 15A formed on a main guide shaft fixing member 15 to a direction of an arrow C and fixed in a state supported by the support member 14.

Therefore, a horizontal position of the main guide shaft 13 in the direction of the rotation shaft 20 of the spindle motor 3 is regulated by the side-face position regulating portion 14A of the support member 14, and a position in the axial direction of the rotation shaft 20, that is, in the vertical direction is regulated by the lower-face position regulating portion 14B of the support member 14. In this way, the position in the horizontal direction and the position in the vertical direction of the main guide shaft 13 are determined by the support member 14.

Since the support member 14 regulating the position of the main guide shaft 13 in the horizontal direction and the vertical direction is integrally formed on the motor substrate 2 on which the spindle motor 3 is loaded and fixed, the positional relationship of the main guide shaft 13 with respect to the rotation shaft 20 of the spindle motor 3 can be set with accuracy. That is, it can be so configured that the relationship between the optical pickup device 7 whose moving position is regulated by the main guide shaft 13 and the optical disc loaded on the turntable 19 driven to rotate by the rotation shaft 20 becomes the best state.

Figure 4:
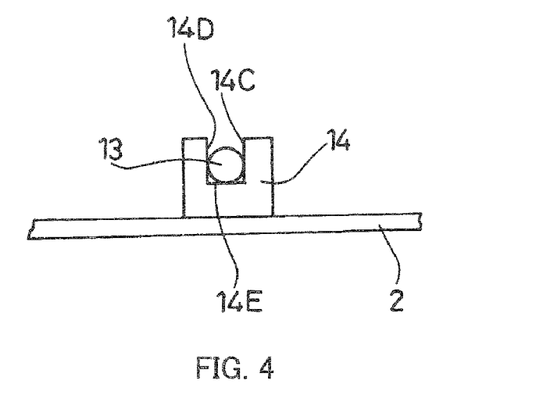
FIG. 4 is a front view of an essential part illustrating another example of a support member 14.

In the above-described embodiment, the side-face position regulating portion 14A regulating the horizontal position and the lower-face position regulating portion 14B regulating the vertical position are provided on the support member 14, while as shown in FIG. 4, first and second side-face position regulating portions 14C and 14D (second regulating face, third regulating face) regulating the position in both directions, which are horizontal directions, and a lower-face position regulating portion 14E (first regulating face) regulating a lower-face position can be provided.

Figure 5:
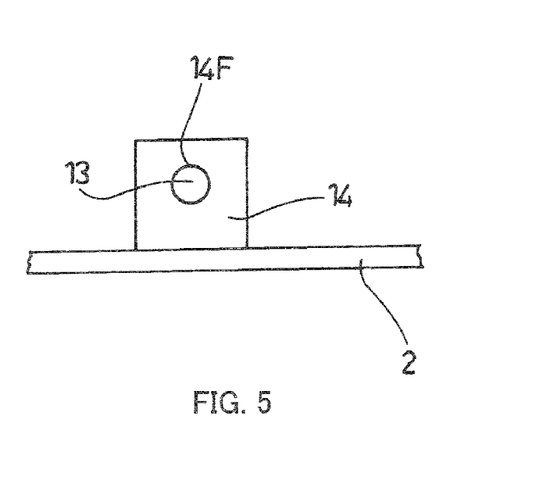
FIG. 5 is a front view of an essential part illustrating another example of the support member 14.

Also, as shown in FIG. 5, by forming a circular hole 14F (cylindrical-shaped hole) into which the main guide shaft 13 is inserted on the support member 14, the position of the main guide shaft 13 in all the vertical and horizontal directions (directions orthogonal to the longitudinal direction of the main guide shaft 13) can be regulated.

Figure 6:
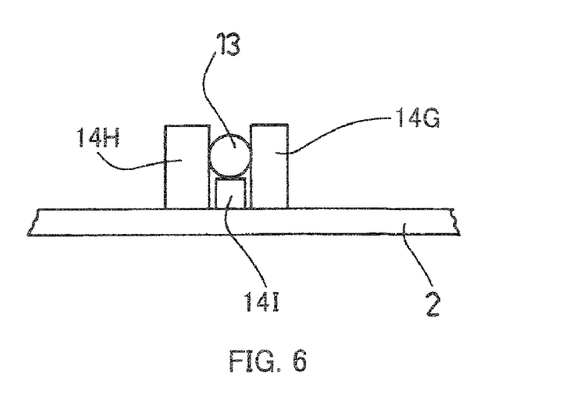
FIG. 6 is a front view of an essential part illustrating another example of the support member 14.

Moreover, as shown in FIG. 6, three independent support members, that is, two support members 14G and 14H (support members each having faces corresponding to the above second regulating face and the third regulating face) regulating the position in the horizontal direction and one support member 141 regulating the position in the vertical direction can be formed on the motor substrate 2. The above three support members are support members equivalent to the support member 14 having the first to third regulating faces.

Also, the rotation support concave portion 2A provided on the motor substrate 2 is formed by press forming the motor substrate 2, while if the support member 14 is simultaneously formed at this press forming, a work process is simplified, and the positional relationship between the position of the support member 14 and the rotation shaft 20 can be accurately set.

Second Embodiment

An optical disc apparatus according to a second embodiment is configured such that the optical pickup device is moved in a radial direction of an optical disc loaded on a turntable by a main guide shaft inserted through a guide hole provided in the optical pickup device and having a circular section and a sub guide shaft inserted through a U-shaped groove provided in the optical pickup device, and two support members supporting one ends of the main guide shaft and the sub guide shaft, respectively, are integrally formed with a motor substrate on which a bearing rotatably supporting a rotation shaft of a spindle motor for driving the turntable to rotate is fixed and on which the spindle motor is loaded and fixed.

Also, in the two support members of the optical disc apparatus according to the second embodiment, a side-face position regulating portion to abut side faces and a lower-face position regulating portion to abut lower faces of the main guide shaft and the sub guide shaft are formed, respectively.

Also, in the two support members of the optical disc apparatus according to the second embodiment, two side-face position regulating portions to abut both side faces of the main guide shaft and the sub guide shaft are formed, respectively.

Also, in the two support members of the optical disc apparatus according to the second embodiment, lower-face position regulating portions to abut lower faces of the main guide shaft and the sub guide shaft are formed, respectively.

Also, in the two support members of the optical disc apparatus according to the second embodiment, circular holes into which the main guide shaft and the sub guide shaft are inserted are formed, respectively.

Also, the two support members of the optical disc apparatus according to the second embodiment are integrally formed with the motor substrate by press forming the motor substrate.

According to the optical disc apparatus according to the second embodiment, since a moving operation of the optical pickup device is guided by the motor substrate on which the bearing supporting the rotation shaft of the spindle motor, which is a rotation shaft of the turntable, is fixed and the positions of the main guide shaft and the sub guide shaft determining the position of the optical pickup device are regulated, the positional relationship between the turntable and the optical pickup device can be set accurately.

Also, according to the optical disc apparatus according to the second embodiment, since inclination of the main guide shaft and the sub guide shaft guiding the moving operation of the optical pickup device with respect to the turntable can be accurately set, the positional relationship between: the optical disc, which is loaded on the turntable, driven to rotate; and the optical pickup device whose displacement position is regulated by the both guide shafts, particularly the positional relationship in a tangential direction can be accurately set.

Also, according to the optical disc apparatus according to the second embodiment, since the positional relationship between the position of the turntable and the optical pickup device can be brought to the best state by the simple configuration that the two support members regulating the positions of the main guide shaft and the sub guide shaft, respectively, are provided on the motor substrate, adjustment work at an assembling work is no longer needed, and a great effect can be exerted in reduction of a manufacturing cost.

Also, according to the optical disc apparatus according to the second embodiment, since the two support members are formed on the motor substrate by press forming the motor substrate, the positional relationship between the turntable and the main guide shaft as well as the sub guide shaft can be accurately set by improving the accuracy of the press forming.

Also, according to the optical disc apparatus according to the second embodiment, since the two support members supporting the one ends of the main guide shaft and the sub guide shaft, respectively, are provided on the motor substrate constituting the spindle motor, there is a merit that thickness reduction is easier than the case in which the support members are formed on a substrate on which the motor substrate is fixed or the like.

The second embodiment will be specifically described below, in FIGS. 7 to 9, the same reference numerals are given to the same configurations as the configurations in the first embodiment, and the description will be omitted.

Figure 8:
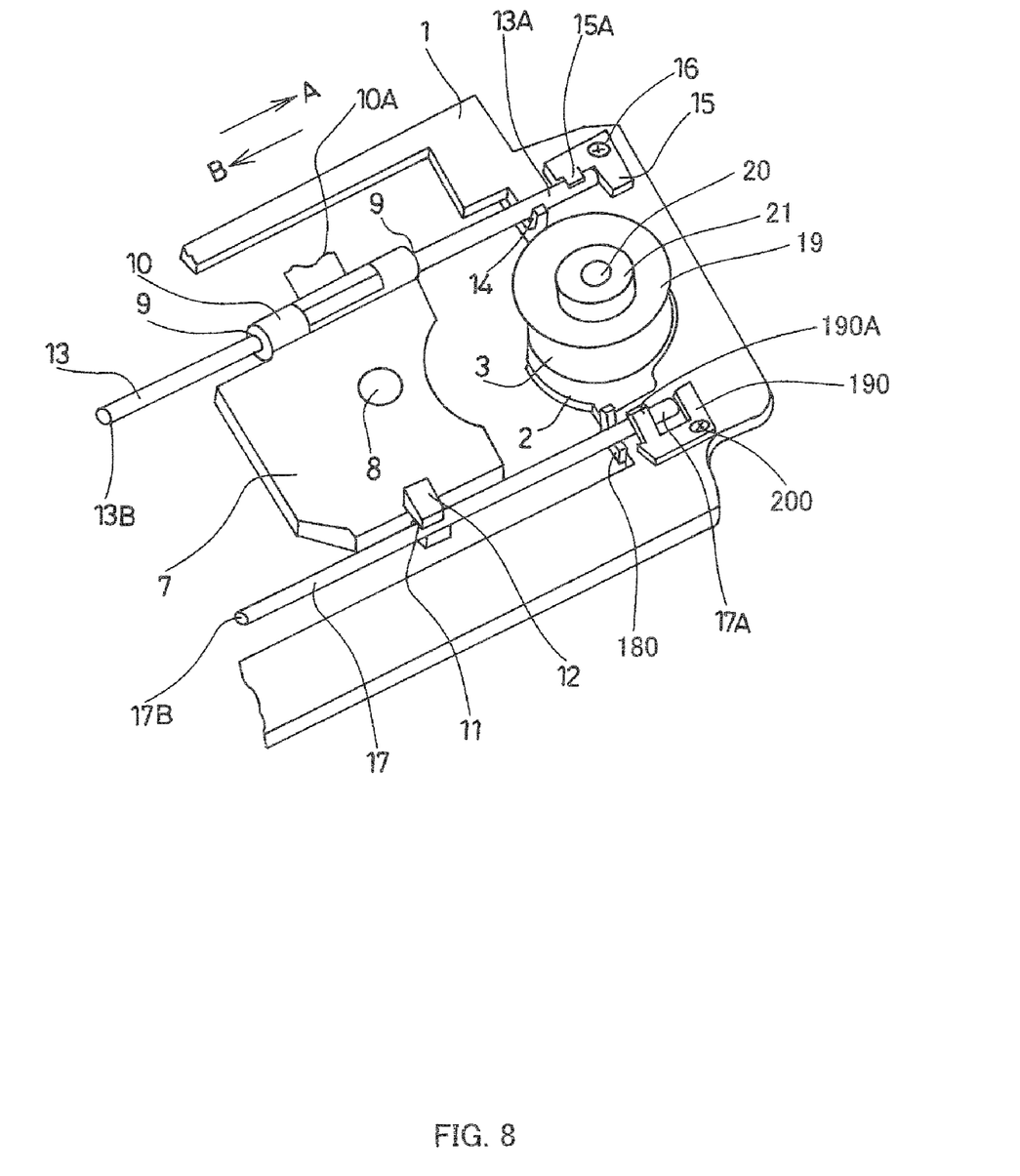
FIG. 8 is a perspective view of an essential part illustrating an optical disc apparatus according to the second embodiment of the present invention.
Figure 9:
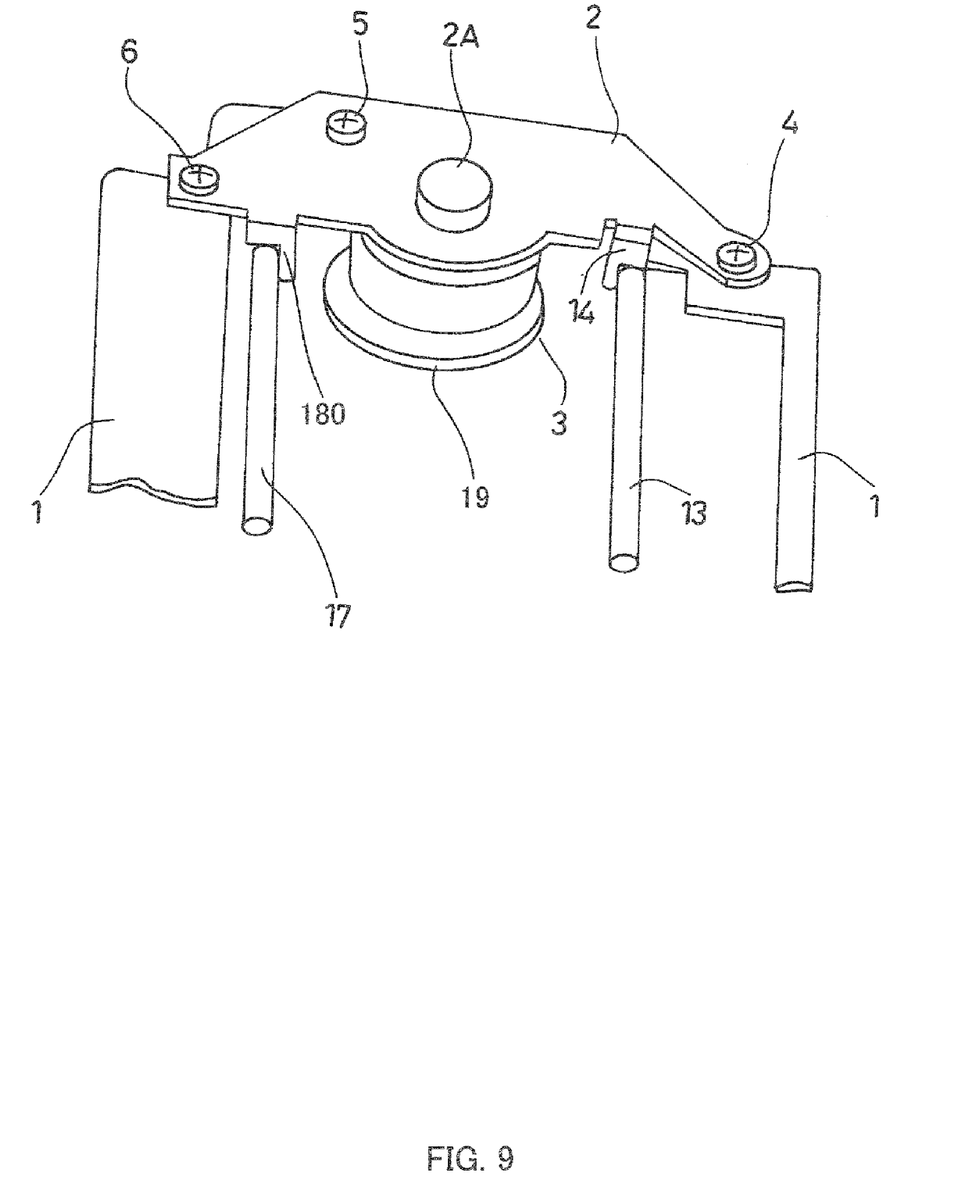
FIG. 9 is a perspective view of an essential part of the optical disc apparatus according to the second embodiment of the present invention when seen from below.

In FIG. 8, the one end 17A of the sub guide shaft 17 has its position regulated by a support member 180 (second support member) integrally formed at a position adjacent to the spindle motor 3 on the motor substrate 2 and on the side opposite the support member 14, while the other end 17B of the sub guide shaft 17 is fixed by a fixing member (not shown) formed on the fixing substrate 1. Reference numeral 190 denotes a sub guide shaft fixing member fixed to the fixing substrate 1 by a screw 200, and on the sub guide shaft fixing member 190, a plate spring 190A for pressing and biasing the one end 17A of the sub guide shaft 17 for fixation is formed.

The optical disc apparatus according to the second embodiment is configured as mentioned above, and the gist of the second embodiment will be described below referring to FIG. 7.

A position of the turntable 19 is determined by bearings 24 and 25 fastened to the rotation-shaft support member 22 fixed to the rotation support concave portion 2A formed on the motor substrate 2. On the other hand, the main guide shaft 13 and the sub guide shaft 17 positioning the optical pickup device 7 are configured such that their positions are regulated by the support member 14 and the support member 180 integrally formed on the motor substrate 2.

Figure 7:
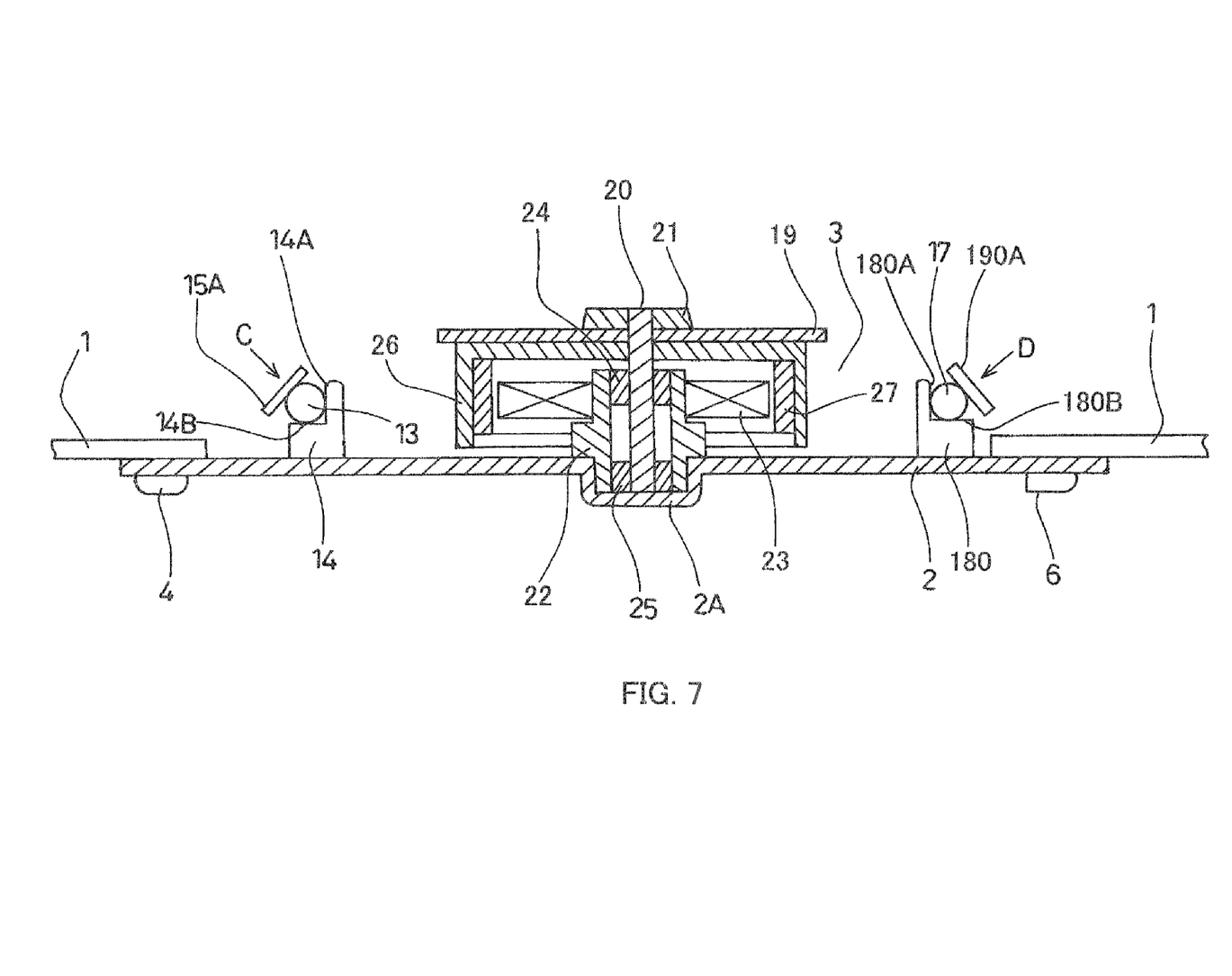
FIG. 7 is a sectional view of an essential part illustrating an optical disc apparatus according to a second embodiment of the present invention.

The first support member 14 is, as shown in FIG. 7, constituted by the side-face position regulating portion 14A abutting the side face of the main guide shaft 13 and the lower-face position regulating portion 14B abutting the lower face of the main guide shaft 13. The one end 13A of the main guide shaft 13 is pressed and biased by the plate spring 15A formed on the main guide shaft fixing member 15 in the direction of the arrow C for fixation.

Therefore, the horizontal position of the main guide shaft 13 in the direction of the rotation shaft 20 of the spindle motor 3 is regulated by the side-face position regulating portion 14A of the support member 14, while the position in the axial direction of the rotation shaft 21, that is, the vertical direction is regulated by the lower-face position regulating portion 14B of the support member 14. In this way, the position in the horizontal direction and the position in the vertical direction of the main guide shaft 13 are determined by the support member 14.

Since the support member 14 regulating the position in the horizontal direction and the vertical direction of the main guide shaft 13 is integrally formed on the motor substrate 2 constituting the spindle motor 3, the positional relationship of the main guide shaft 13 with respect to the rotation shaft 20 of the spindle motor 3 can be set with accuracy. That is, it can be so configured that the relationship between the optical pickup device 7 whose moving position is regulated by the main guide shaft 13 and the optical disc loaded on the turntable 19 driven to rotate by the rotation shaft 20 becomes the best state.

The main guide shaft 13 is positioned by the support member 14 as mentioned above, and the positioning of the sub guide shaft 17 will be described below. The support member 180 positioning the sub guide shaft 17 is constituted by a side-face position regulating portion 180A (second regulating face) abutting the side face of the sub guide shaft 17 and a lower-face position regulating portion 180B (first regulating face) abutting the lower face of the sub guide shaft 17 as shown in FIG. 7. The side-face position regulating portion 180A regulates movement of the sub guide shaft 17 in the direction of the spindle motor 3. The lower-face position regulating portion 180B regulates the movement of the sub guide shaft 17 in the direction of the motor substrate 2. The one end 17A of the sub guide shaft 17 is pressed and biased by a plate spring 190A formed on the sub guide shaft fixing member 190 in the direction of the arrow D for fixation.

Therefore, the horizontal position of the sub guide shaft 17 in the direction of the rotation shaft 21 of the spindle motor 3 is regulated by the side-face position regulating portion 180A of the support member 180, while the position in the axial direction of the rotation shaft 21, that is, in the vertical direction, is regulated by the lower-face position regulating portion 180B of the support member 180. In this way, the position in the horizontal direction and the position in the vertical direction of the sub guide shaft 17 are determined by the support member 180.

Since the support member 180 regulating the position of the sub guide shaft 17 in the horizontal direction and the vertical direction is integrally formed on the motor substrate 2 on which the spindle motor 3 is loaded and fixed, the positional relationship of the sub guide shaft 17 with respect to the rotation shaft 20 of the spindle motor 3 can be set with accuracy. That is, it can be so configured that the relationship between the optical pickup device 7 whose moving position is regulated by the sub guide shaft 17 and the optical disc loaded on the turntable 19 driven to rotate by the rotation shaft 20 becomes the best state.

As mentioned above, since the support members 14 and 180 that regulate the positions of the main guide shaft 13 and the sub guide shaft 17 provided in order to guide the optical pickup device 7 performing a reading operation of a signal recorded in the optical disc in the radial direction of the optical disc are integrally formed on the motor substrate 2 on which the bearings 24 and 25 rotatably supporting the rotation shaft 20 of the spindle motor 3 are fixed, the positional relationship between the turntable 19 fixed to the rotation shaft 20 and the optical pickup device 7 can be set accurately.

Then, since the support members 14 and 180 regulating the positions of the main guide shaft 13 and the sub guide shaft 17 are integrally formed on the motor substrate 2 on which the bearings 24 and 25 rotatably supporting the rotation shaft 20 of the spindle motor 3 are fixed, that is, the support members 14 and 180 are integrally formed on the same substrate, the positional relationship between the main guide shaft 13 and the sub guide shaft 17 can be set accurately.

Therefore, since the inclination of the main guide shaft 13 and the sub guide shaft 17 in the horizontal direction can be set in the optimal state, the positional relationship in the tangential direction of the optical pickup device 7 with respect to the optical disc can be set so as to be in the best state.

In the above-mentioned embodiment, the side-face position regulating portion 14A regulating the horizontal position and the lower-face position regulating portion 14B regulating the vertical position are provided with respect to the support member 14 supporting the main guide shaft 13, but not limited to that.

For example, as described in FIG. 4 of the first embodiment, on the support member 14, the first and second side-face position regulating portions 14C and 14D (second regulating face and the third regulating face) regulating the position in the both directions, which are the horizontal direction, and the lower-face position regulating portion 14E (first regulating face) regulating the lower face position may be formed as shown in FIG. 4. According to this configuration, since the position in the horizontal direction is regulated by the support member 14, when an impact is received, large displacement of the main guide shaft 13 in the horizontal direction can be prevented. Moreover, similarly to the support member 14 supporting the main guide shaft 13, the support member 180 supporting the sub guide shaft 17 may be formed as shown in FIG. 4.

Also, as described in FIG. 5 of the first embodiment, for example, on the support member 14, the circular hole 14F (cylindrical-shaped hole) into which the main guide shaft 13 is inserted may be formed as shown in FIG. 5. According to this configuration, since the position in all the vertical and horizontal directions (direction orthogonal to the longitudinal direction of the main guide shaft 13) is regulated by the support member 14, when an impact is received, large displacement in all the directions of the main guide shaft 13 can be prevented. Moreover, similarly to the support member 14 supporting the main guide shaft 13, the support member 180 supporting the sub guide shaft 17 may be formed as shown in FIG. 5.

Also, as described in FIG. 6 of the first embodiment, for example, instead of the support member 14, the three independent support members, that is, the two support members 14G and 14H (support members having faces corresponding to the above second regulating face and the third regulating face, respectively) regulating the position in the horizontal direction and the single support member 14I regulating the position in the vertical direction may be formed on the motor substrate 2. The above three support members are support members equivalent to the support member 14 having the first to third regulating faces. Moreover, similarly to the support member 14 supporting the main guide shaft 13, the support member 180 supporting the sub guide shaft 17 may be formed as shown in FIG. 6.

The support members 14 and 180 of the second embodiment are integrally formed on the motor substrate 2, and a forming method of the support members 14 and 180 will be described.

The rotation support concave portion 2A provided on the motor substrate 2 constituting the spindle motor 3 is formed by press forming the motor substrate 2, and by forming the support members 14 and 180 at the same time by press forming when this press forming is performed, the work process is simplified and moreover, the positional relationship between the support members 14 and 180 and the positional relationship with the rotation shaft 21 can be set accurately.

The above embodiments of the present invention are simply for facilitating the understanding of the present invention and are not in anyway to be construed as limiting the present invention. The present invention may variously be changed or altered without departing from its spirit and encompass equivalents thereof.

What is claimed is:

1. An optical disc apparatus, comprising:
a spindle motor configured to drive a turntable on which an optical disc is loaded to rotate;
a first substrate on which a first support member rotatably supporting a rotation shaft of the spindle motor is fixed, and on which a second support member is formed at a position on one side adjacent to the spindle motor;
a second substrate;
an optical pickup device; and
a guide member configured to guide the optical pickup device in a radial direction of the optical disc loaded on the turntable, wherein
the guide member includes a rod member cylindrical in shape slidably holding one side end of the optical pickup device;
one end of the rod member is supported by the second support member on the first substrate and fixed to a fixing member on the second substrate;
the other end of the rod member is fixed to another fixing member on the second substrate; and
the second support member includes a first regulating face abutting the rod member and regulating movement of the rod member in a direction of the first substrate and a second regulating face abutting the rod member and regulating movement of the rod member in a direction of the spindle motor.

2. The optical disc apparatus according to claim 1, wherein the second support member is integrally formed to the first substrate by press forming the first substrate.

3. The optical disc apparatus according to claim 1, wherein the second support member further includes a third regulating face abutting the rod member and regulating movement of the rod member in a direction opposite the spindle motor.

4. The optical disc apparatus according to claim 1, wherein the second support member includes a cylindrical-shaped hole into which the rod member is inserted.

5. An optical disc apparatus, comprising:
a spindle motor configured to drive a turntable on which an optical disc is loaded to rotate;
a first substrate on which a first support member rotatably supporting a rotation shaft of the spindle motor is fixed, and on which a pair of second support members are formed at positions on both sides adjacent to the spindle motor;
a second substrate;
an optical pickup device; and
a guide member configured to guide the optical pickup device in a radial direction of the optical disc loaded on the turntable, wherein
the guide member includes a pair of rod members cylindrical in shape slidably holding the both side ends of the optical pickup device;
one end of each of the pair of rod members are supported by the pair of second support members on the first substrate, respectively, and fixed to fixing members on the second substrate, respectively;
the other ends of the pair of rod members are fixed to other fixing members on the second substrate, respectively; and each of the second support members includes a first regulating face abutting the rod member and regulating movement of the rod member in a direction of the first substrate and a second regulating face abutting the rod member and regulating movement of the rod member in a direction of the spindle motor.

6. The optical disc apparatus according to claim 5, wherein each of the pair of second support members further includes a third regulating face abutting the rod member and regulating movement of the rod member in a direction opposite the spindle motor.

7. The optical disc apparatus according to claim 5, wherein each of the pair of second support members includes a cylindrical-shaped hole into which the rod member is inserted.

* * * * *